W. M. FULTON.
ELECTRIC BRAZING APPARATUS.
APPLICATION FILED JAN. 26, 1907.
916,140.
Patented Mar. 23, 1909.
3 SHEETS—SHEET 3.
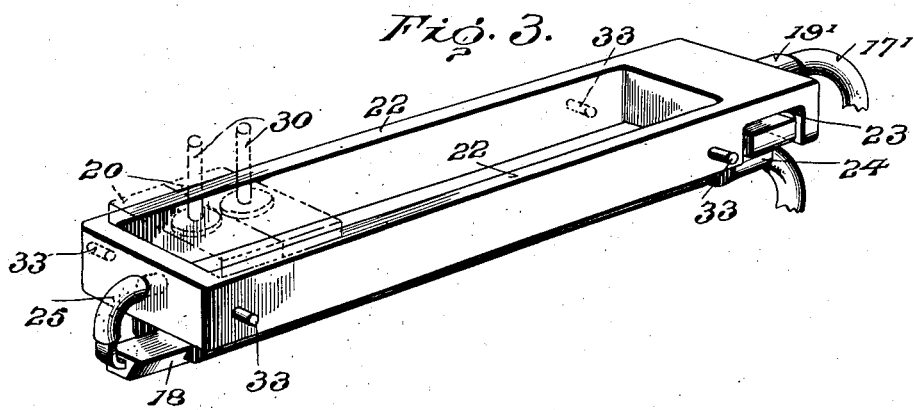
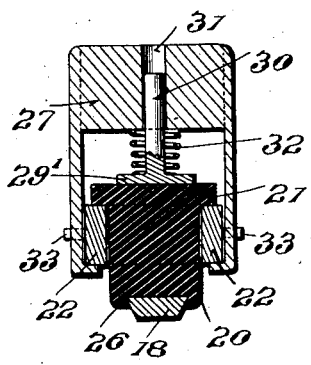
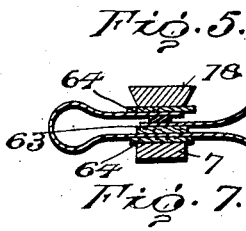
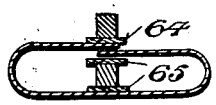
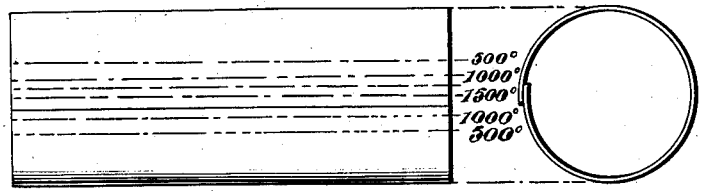
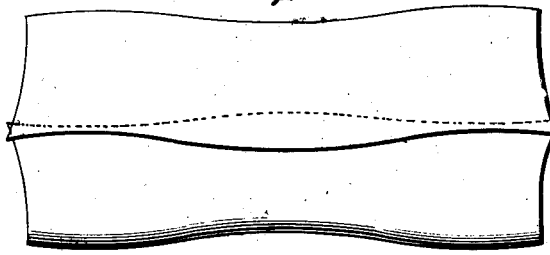
Witnesses
Frederick A. Holton
Ruth C. Fitzhugh
Inventor
Weston M. Fulton
By Mauro, Cameron, Lewis & Massie
Attorney

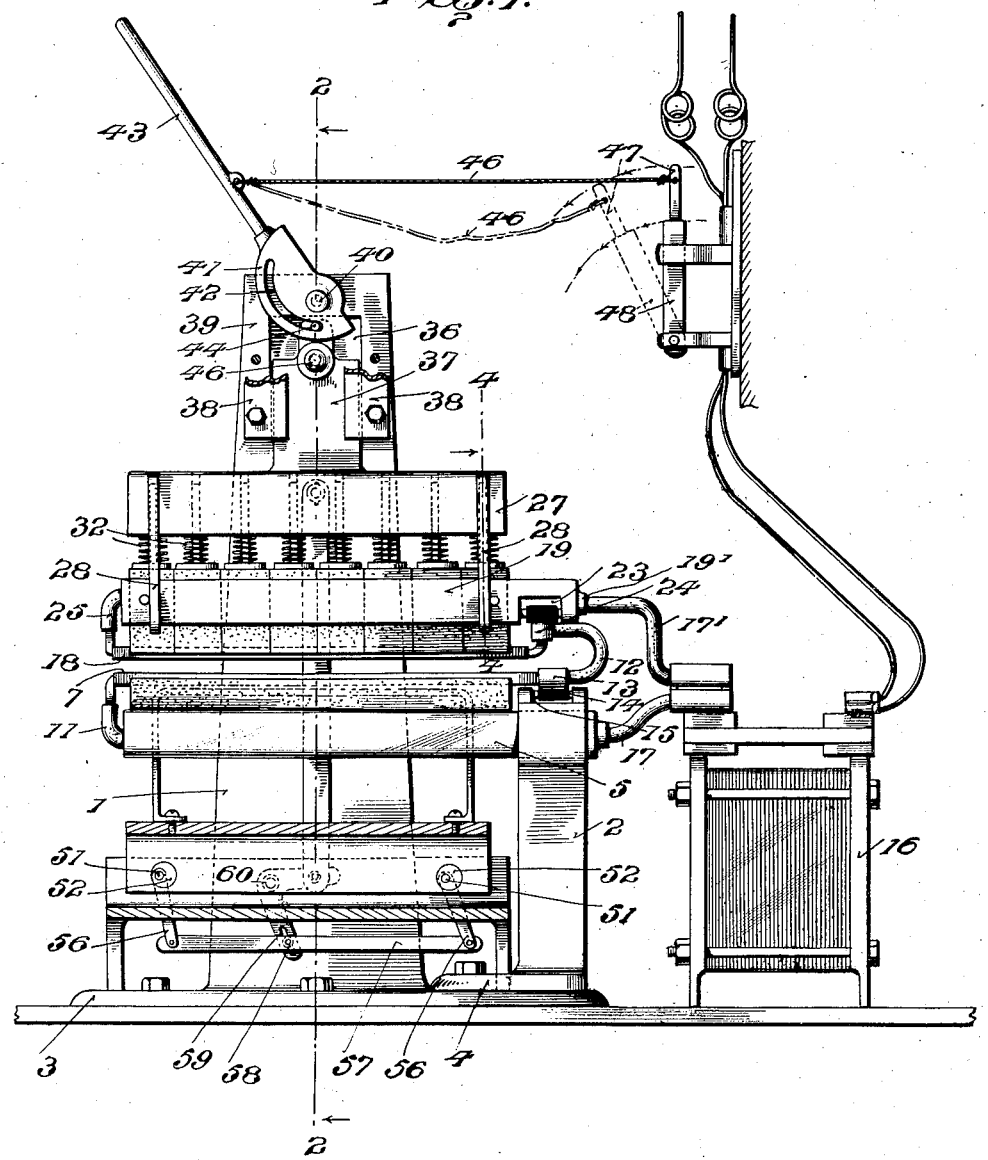

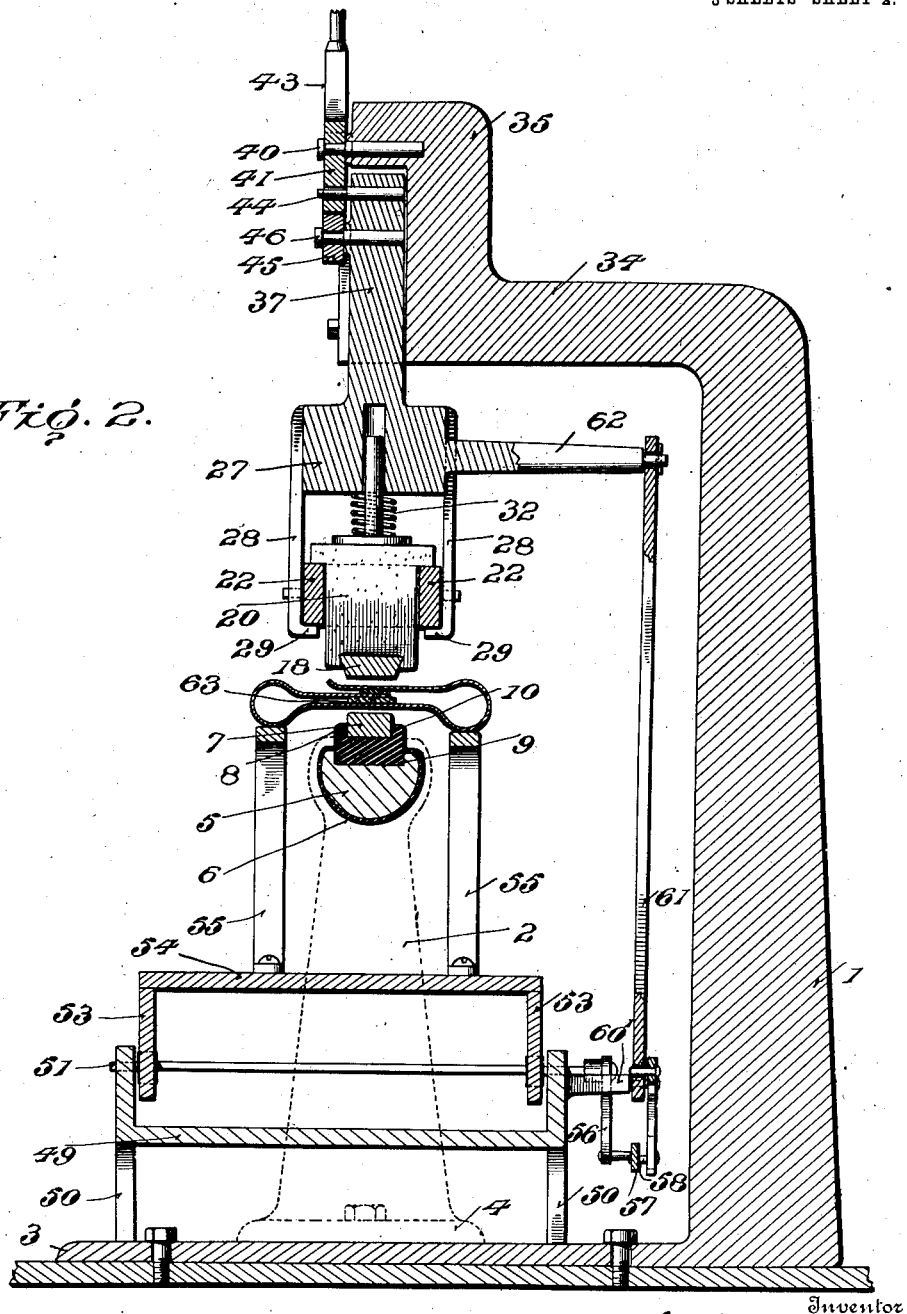

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

ELECTRIC-BRAZING APPARATUS.

No. 916,140.  Specification of Letters Patent.  Patented March 23, 1909.

Application filed January 26, 1907. Serial No. 354,300.

*To all whom it may concern:*

Be it known that I, WESTON M. FULTON, of Knoxville, Tennessee, have invented a new and useful Electric-Brazing Apparatus, which invention is fully set forth in the following specification.

This invention relates to a machine for electrically brazing seams, particularly longitudinal seams of thin tubular bodies.

In my U. S. Patent No. 853,351, issued May 14, 1907, I have shown machines of the class referred to in which the overlapping edges of the metal are pressed together between heating bars yieldingly held against the work by non-heat-conducting clamping bars. While the bars are in brazing position the heating current either direct or alternating, is passed through the heating bars, which are insulated from the work, thereby melting the cementing material between the lapped edges and closing the seam.

The present invention embodies improvements upon the invention disclosed in my prior Patent 853,351, and has among its principal objects to reduce the heat losses during the period of brazing and thereby economize in the use of the electric current; to overcome, when using an alternating current, the evil effects of induced currents which may be set up in the work and which cause an imperfect and unsatisfactory seam; to secure a better distribution of heat in the tubular body, whereby the overlapping edges of the seam will not be warped during brazing; and to generally improve the construction of electric brazing machines and methods of brazing.

With the above objects in view, the invention consists of the improved features of construction hereinafter described and then pointed out in the claims.

While the invention is capable of receiving various mechanical expressions without departing from the principle thereof, the preferred embodiment is shown for the purpose of illustration in the accompanying drawings; in which—

Figure 1 is a side elevational view of the machine, partly in section; Fig. 2 is a vertical transverse section on the line 2—2, Fig. 1; Fig. 3, is a detail perspective view of an electric conductor; Fig. 4 is a sectional view on the line 4—4, Fig. 1; Figs. 5 and 6 are details showing different methods of forming the seam; Figs. 7, 8 and 9 are diagrammatic views showing unequal distribution of heat and its distorting effect on the seam.

Referring to Figs. 1 and 2, the working parts of the machine are preferably supported by two vertical posts 1, 2, one of which is provided with a base-plate 3 to be secured to the floor, and the other with a projecting foot 4 which may be bolted to plate 3. The upper end of post 2 is provided with an opening for receiving one end of a horn 5, preferably semicircular in cross-section and of metal having high conductivity, such as copper. The horn is insulated from the post by means of an insulating bushing 6 of hard fiber and serves the double purpose of an electric conductor of low resistance and a support for one of the heating or brazing bars 7 and its heat lagging backing 8. The top face of the horn 5 is provided with a longitudinal groove 9 for receiving the heat lagging bar 8, which is made of refractory material such as fire-clay or fire-clay containing graphite and capable of insulating the horn 5 from the brazing bar 7, which rests in a groove 10 in the upper face of the heat-lagging bar 8. One end of the heating or brazing bar 8 is in metallic contact with the horn 5 through a cable 11, which, as shown, may be connected to the downturned end of the bar and to the horn by a brazed or other suitable connection. The opposite end of the brazing-bar 7 connects with a cable 12 through a self-adjusting device consisting of a connector 13 of metal mounted on an insulating block 14 sliding on rods 15 in a recess in the top of post 2 only one of which rods appears in the drawing. This adjusting device is not a part of the present invention and it is claimed in my above patent No. 853,351. The horn 5 connects with one terminal of a source of current, such as a transformer 16, by means of a flexible cable 17 preferably attached to the end of the horn where it projects through the opening in post 2.

The movable brazing bar 18, like its stationary companion bar 7, is of refractory metal, such as iron or nickel, which, though a conductor of electricity, offers sufficient resistance thereto to enable heat to be rapidly generated therein by the passage of an electric current therethrough. This bar 18 is suspended from a rectangular electric conductor 19 which is best shown in Fig. 3. As here shown the conductor consists of a long rectangular metal frame, preferably of copper, having a central longitudinal opening for receiving a plurality of T-shaped heat-lagging members 20. Each member 20 is provided with side shoulders 21 for taking over the side bars 22 of the conductor 19, and is of sufficient length to extend somewhat beyond the lower face of the conductor when the shoulders 21 are supported by the side-bars 22. Near one end, and in the lower side of conductor 19, is a recess 23 for receiving a self-adjusting connector 24 for making electric connection between the ends of cable 12 and of brazing bar 18, and in all respects like the connector above described for connecting bar 7 and cable 12. The outer end of brazing bar 18 may be, and preferably is, electrically connected to conductor 19 by means of a flexible cable 25, which has one end connected to the upturned portion of brazing-bar 18 and its opposite end inserted in a recess and brazed to the end of conductor 19. A cable 17' connects the transformer 16 with the end of the conductor 19. The terminal of the cable is preferably inserted in a recessed hub 19' and secured therein by brazing. For the purpose of preventing the brazing-bar from sagging, particularly when the bar is heated in its raised position, each of the heat-lagging members is provided in its lower face with a retaining groove 26 which is wider at its base than at its top. The bar is made of a similar cross-section to the slots, whereby it may be held therein in any position of the conductor 19.

The conductor 19 carrying the brazing-bar 18 and heat-lagging members 20 is raised and lowered by means of a vertically movable bolster 27 having four depending side arms 28 provided with inwardly projecting shoulders 29 which take under the side bars 22 to raise and to lower the conductor. Between the lower face of the bolster and the tops of the heat-lagging members 20 I provide means for applying a yielding pressure to each member 20 when the brazing bar 18 is lowered into brazing position on the work. As an example of such means, I provide plates 29' which rest on the tops of the members 20 and which have guide stems 30 entering holes 31 in bolster 27. Around each stem between the bolster and plate is a spring 32 which transmits a yielding pressure to the several heat-lagging members when the bolster 27 has lowered the brazing-bar into brazing position, and continues its downward movement, as will be more fully explained later.

Projecting from the sides of the conductor 19 are guide pins 33 which have for their object to prevent lengthwise movement of the conductor 19 between arms 28.

The post 1 is provided with a horizontally projecting arm 34 terminating in a head 35 having a rectangular recess 36 in which is fitted a cross-head 37 of bolster 27, and which is retained in the recess by metal plates 38, 38 bolted to the faces of the walls 39 and extending somewhat over the recess and the cross-head. Revolubly mounted on a pin 40 fast in the head 35 is an eccentric cam 41 having a slot 42 concentric with the cam-surface. The cam is also provided with a handle 43 for imparting movement to the same. A pin 44 fast to an extension of the cross-head 37 engages the slot 42 while the face of the cam engages a friction-roller 45 loosely mounted on a pin 46 projecting from the face of the cross-head. It will be seen from this construction that when cam-handle 43 is lowered sufficiently the outer cam face bears against roller 45 and forces the cross-head 37 down, and when the handle is raised the pin 44 bears on the lower face of the cam-slot 42 and lifts the cross-head.

I may, and preferably do, provide means for cutting off the heating current when the brazing-bar is lowered into heating contact with the work, such as by a flexible cable 46 connecting the cam-handle with the pivoted handle 47 of the current controlling switch 48. Movement of the handle 47 to the left lowers the cam and also withdraws the switch blade and breaks the circuit, as clearly shown in Fig. 1.

To enable the work to be supported between and out of contact with the brazing-bars while the latter are being heated, I provide a vertically movable work-supporter. The means for operating the supporter is preferably actuated by power transmitted to it from some part of the movable cross-head or bolster above referred to. Referring to Fig. 2, a trough-shaped body 49, having legs 50—50 rests upon the base-plate 3. Near each end of the body 49 are pivoted two rods 51, 51, each of which is provided with a pair of eccentrics 52, which engage in journals in the depending walls 53 of an inverted trough-shaped body 54 upon which are secured two inverted U-shaped work-holding members 55. Rods 51, 51 are of sufficient length to extend through the sides of the body 49 on one side thereof and are each provided with crank-arms 56, 56 fast thereto, and are connected together through a driving member 57 which is provided with a stud 58 engaging in a slot 59 in one arm of a bell-crank lever 60 which is pivotally supported on a bracket 60' extending from the trough body 49. The other arm of the bell-crank lever is pivotally connected to a vertical driving shaft 61 which receives power through an arm 62 fast to the vertically movable bolster 27. The work support moving means is so proportioned that the motion received by it from the moving bolster will cause the support to move about one-half as fast as the bolster, the purpose of which will appear below.

To enable a better understanding of the method of brazing carried out by aid of the above-described machine, an explanation will be made of what takes place during the process of brazing lapped edges of a sheet of metal to form a tubular body when the brazing-bars are heated to the brazing temperature while in heating contact with the seam as heretofore practiced in electric brazing machines. The sheet of metal, after being bent into tubular form, is clamped between two brazing-bars at its over-lapping edges with the usual cementing material and flux applied between the lapped edges. The current is then turned on to heat the bars and also the seam which is in heating contact with the bars but insulated therefrom. During the time the brazing-bars are being heated by the current the metal walls of the tube receive heat by conduction and radiation from the brazing-bars, thereby causing an unnecessary loss of heat from the bars during their heating period preparatory to brazing. Since the production of heat by the electric current is expensive, it becomes a matter of much practical importance to avoid unnecessary losses of heat during the brazing operation, and especially where such losses are accumulative, as in electric brazing. I therefore provide for heating the welding bars while they are out of heating contact with the seam, and thereby avoid the dissipation of heat by conduction along the walls of the tube, and further by passing the heating current through the brazing-bars while out of contact with the seam I am also enabled to heat them more quickly, because in a given length of time less heat is given to surrounding bodies.

Referring to Fig. 7, it will be evident that the longer the heating-bar is in contact with the seam the farther the heated area extends away from the seam, the lines of highest temperature (1500° F., for example) occurring at the center of the seam, the temperature falling off to either side. As rapidity of brazing is desired, the current is cut off the instant the cementing material melts. The source of heat being withdrawn the cementing material sets before the distribution of heat around the tube is established. The result is that the metal at the edges of the seam expands more than it does along lines back from the edges. The edges take on a fan-shape, as seen in Fig. 9, and the finished tube is of smaller diameter at the middle than at the ends. To overcome this unequal expansion of the metal, I provide for a better distribution of heat in the work by heating the tube at points opposite the seam, which may be done by collapsing the tube, as indicated in Figs. 2 and 5 and applying the heating-bars on opposite sides of the tube, or, as shown in Fig. 6, by placing one of the bars inside the tube and in heating contact with that portion of the tube opposite the seam and insulated therefrom by asbestos or mica sheets 65.

Owing to the great facility with which an alternating current can be transmitted, the heating of the brazing-bars is perfectly effected by aid of an alternating current. In passing such a current through the bars while they are in close proximity to the seam, but separated therefrom by thin insulating material, eddy currents are set up in the metal tube which at times seriously interfere with the brazing by setting up electrolytic action in the flux, or by causing through electric-repulsion both the flux and cementing material to be driven from between the lapped edges of the seam, particularly when using an alternating current of large amperage and low voltage. I therefore prefer to pass the alternating current through the bars while they are out of heating contact with the work and to cut off the current while the bars are heating the seam to the brazing temperature.

In view of the foregoing explanations, I will now describe the method of brazing as carried out in the machine above described. A sheet of metal is bent so that its opposite edges overlap to form a collapsed tube having rounded bends, as indicated in Fig. 2 for example. The heating bars 7 and 18 are then separated by moving arm 43 to the right and the folded sheet of metal is placed on the railings 55 of the work-supporter, the overlapping edges of the seam being directly between the heating bars but not in contact with either. The usual flux, with a strap of spelter, is inserted between the overlapping edges, and a strip of heat-resisting and insulating material, such as asbestos paper 63, is inserted between the lower inner side of the tube and the lower lapped edge to prevent any small portion of surplus spelter from cementing together the walls of the collapsed tube. The upper overlapping edge is preferably made to extend somewhat beyond the edge of the upper heating bar in order to prevent any surplus spelter from adhering to the bar, as shown in Fig. 2. Switch 48 is now closed, permitting current from the transformer to pass through the two bars in series. The path of the current during a given period is by way of cable 17' from the transformer 16, conductor 19, cable 25, heating-bar 18, connector 24, cable 12, connector 13, heating-bar 7, cable 11, horn 5, cable 17 to terminal of transformer 16. In closing the switch 48 the flexible cable is rendered taut. As soon as the heating bars are at the required temperature handle 43 is turned to the left, thereby causing the cam 41 to depress bolster 27 and brazing-bar 18. The vertical driving member 61, pivotally connected to arm 62 of bolster 27 also descends and in doing so operates the bell-crank lever 60 and lowers the work-supporter. The connecting means between the driver 61 and the work-supporter are so adjusted that the work will be lowered into place on the lower brazing-bar at substantially the moment when the upper bar is seated on the seam. In clamping the work, bolster 27 is forced downward to compress springs 32, thereby causing arms 28, 28 to descend and permit conductor 18 to leave members 20 free to adjust themselves to any slight irregularities along the heating bars and thus insure that the seam shall be securely clamped at all points along the bars. In the act of turning arm 43 to lower the upper brazing-bar 18 the cable 46 acts on the handle of the switch 48 and cuts off the current before the heating bars come in contact with the work. The bar is prevented from sagging while in its heated condition by reason of the retaining grooves 26 in the members 20. The highly heated bars coming in contact with the work immediately melt the spelter, but since they are in contact with the relatively cold work they rapidly cool below the melting point of the cementing material, thereby enabling the work to be immediately removed, enabling a saving of time and heating current over that required were the bars raised to the brazing temperature while in contact with the work. It is also to be noted that there cannot possibly be any electrolytic action on the flux for the reason that the current has been cut off before the bars contact with the work. Distortion has also been avoided by reason of the peculiar form into which the sheet has been folded, whereby heat is imparted to the seam and also to the region opposite the seam, thereby causing a greater uniformity in the expansion of the metal and production of a tube of uniform diameter. As soon as the seam is made the upper bar is raised by a reverse action of the lever 43 and the work is removed. The switch remains open because of the flexible cable connection, thereby safeguarding the machine. The work is now opened out into true cylindrical shape, as by passing it through a slip-roll former, or by drawing it over a mandrel. The narrow strip which extended beyond the edge of the heating-bar may be cut off to produce a finished appearance, or, in case the tube is to be corrugated and made into a collapsible and expansible vessel, it may remain without disadvantage. To avoid this flap the lap-seam may be made narrower than the width of the face of the heating or brazing bar, as shown in Fig. 5, in which case the face of the bar is preferably protected from the spelter by a piece of asbestos 64, or a facing of mica, or the bar made of carbon to which the spelter will not adhere.

While I prefer to use two heating-bars in the manner described, particularly as two bars give a better distribution of heat than one, yet I may employ but one and secure in a measure the advantages of the invention. When the work is bent into the form of a collapsed tube, as shown in Fig. 1, the seam may be brazed with one or both brazing-bars in heating contact with it while the bars are being heated. In this case insulation is placed between the work and the bar or bars. Induction effects resulting in electrolytic action on the flux, are not present when the two opposite walls of the collapsed tube are near together. Whatever induction is present to set up eddy currents in the tube, such currents are neutralized and do not affect the flux. This has been demonstrated by experiment.

If desired, the brazing-bars may be partly heated by the current while they are out of heating contact with the work and then brought in heating contact therewith while continuing the current, without departing from the spirit of my invention. In this case, the work must be insulated from the bar or bars. The benefits of the method will still be apparent in a saving of heat, though not to the same extent.

What is claimed is:—

1. In an electric brazing machine, the combination of a work-supporting horn, a work-carrier, an electrically-heated brazing-bar, means for moving the same into and out of brazing position, carrier-operating means controlled by the bar moving means, and means for cutting off the current from the brazing-bar when the latter moves into brazing position.

2. In an electric brazing machine, the combination of work-supporting means, an electrically-heated brazing-bar movable into and out of brazing position, and automatic means for cutting off the current from the brazing-bar when the latter moves into brazing position.

3. In an electric brazing machine, the combination of work-supporting means, an electrically-heated brazing-bar, a frame for supporting said bar, a plurality of heat lagging spring-pressed members normally carried by said frame, and means in loose engagement with the frame and said members to raise and lower the frame and to apply distributed pressure to said bar when in brazing position.

4. In an electric brazing machine, the combination of work-supporting means, an electrically-heated brazing-bar movable into and out of brazing position, and yieldingly pressed heat-lagging members for distributing pressure to said bar when in brazing position.

5. In an electric brazing machine, the combination of a brazing-bar, a heat-lagging member having a retaining-groove for receiving and retaining said bar in alinement when the latter is heated out of brazing position, a current-conducting frame supporting said member, and means for raising and lowering said frame.

6. In an electric brazing machine, the combination of a brazing-bar, a horn of high conductivity metallicly connected to said bar, and a heat-lagging member supported by said horn and supporting said bar, and maintaining it in alinement.

7. In an electric brazing machine, the combination of a movable heating-bar and a plurality of spring-pressed means for applying pressures along the bar when heated to conform the bar to irregularities in the seam to be brazed.

8. In an electric brazing machine, the combination of a movable bolster, a conductor detachably connected to said bolster, a brazing-bar movable with said conductor, and means for applying a yielding pressure to said bar after a predetermined traverse of said bolster.

9. In an electric brazing machine, the combination of work supporting means, an electrically heated brazing-bar, a frame supporting said bar, spring pressed heat lagging means engaging said bar and normally carried by said frame, and a member for raising and lowering said frame and movable relatively thereto for applying pressure to said spring pressed means when the frame is in brazing position.

10. In an electric brazing machine, the combination of a work supporting horn, an electric brazing bar movable into and out of brazing position, a work carrier normally holding the work out of contact with said bar during passage of heating current therethrough, bar moving means, and means controlled by said first named means for moving the said carrier into brazing position.

11. In an electric brazing machine, the combination of a stationary work supporting horn, a movable frame opposite said horn, a brazing bar movable with said frame, heat lagging members retained in operative position by said frame, and means for applying distributed pressure through said members to said bar when the latter is in brazing position.

12. In an electric brazing machine, the combination of a stationary work supporting horn, a movable frame opposite said horn, a brazing bar movable with said frame, heat lagging members retained in operative position by said frame, said members having grooves for retaining said bar in alinement when heated out of brazing position and means for applying distributed pressure to said bar when the latter is in brazing position.

13. In an electric brazing machine, the combination of a work-supporting horn, an electrically heated brazing bar, a frame for supporting the same, a plurality of heat lagging pressure members carried by said frame, a vertically movable bolster having members loosely engaging said frame, and springs between the bolster and said pressure members for applying a yielding pressure to said bar when in brazing position.

14. In an electric brazing machine, the combination of a work-holding horn, a vertically movable electrically heated brazing bar above said horn, yielding pressure distributing means engaging said bar to keep the bar in alinement when out of brazing position and for applying distributed pressure to the same when in brazing position.

15. In an electric brazing machine, the combination of a movable bolster, a conductor detachably connected to said bolster, a brazing bar movable with said conductor, resilient pressure means intermediate said bolster and bar, and cam means for raising and lowering said bolster and for applying pressure to same after a predetermined traverse of said bolster.

16. In an electric brazing machine, the combination of a pair of electrically heated brazing bars one of which is movable, a work carrier normally holding the work between the said bars and out of contact therewith during passage of the heating current through the bars, and means for opening the circuit through said bars as the movable bar moves into brazing position.

In testimony whereof I have signed this specification in the presence of two subscribing witnesses.

WESTON M. FULTON.

Witnesses:
J. C. TYLER,
E. J. S. HYATT.